(12) United States Patent
McCallum et al.

(10) Patent No.: US 11,017,748 B2
(45) Date of Patent: May 25, 2021

(54) COPY-ON-WRITE (COW) RENDERING OF GRAPHICAL OBJECT MODELS

(71) Applicant: Red Hat, Inc., Raleigh, NC (US)

(72) Inventors: Nathaniel Philip McCallum, Raleigh, NC (US); Benjamin Petersen, Raleigh, NC (US); Jonathan Michael Toppins, Raleigh, NC (US); Juan Jose Vallejo Orozco, Raleigh, NC (US); Monis Masood Khan, Raleigh, NC (US)

(73) Assignee: RED HAT, INC., Raleigh, NC (US)

(*) Notice: Subject to any disclaimer, the term of this patent is extended or adjusted under 35 U.S.C. 154(b) by 102 days.

(21) Appl. No.: 15/999,383

(22) Filed: Aug. 20, 2018

(65) Prior Publication Data

US 2020/0058273 A1    Feb. 20, 2020

(51) Int. Cl.
| | |
|---|---|
| *G09G 5/393* | (2006.01) |
| *G06F 9/50* | (2006.01) |
| *G06T 1/60* | (2006.01) |
| *G09G 5/395* | (2006.01) |
| *G09G 5/00* | (2006.01) |

(52) U.S. Cl.
CPC .......... *G09G 5/393* (2013.01); *G06F 9/5016* (2013.01); *G06T 1/60* (2013.01); *G09G 5/395* (2013.01); *G09G 5/006* (2013.01); *G09G 2320/02* (2013.01); *G09G 2360/18* (2013.01)

(58) Field of Classification Search
None
See application file for complete search history.

(56) References Cited

U.S. PATENT DOCUMENTS

| | | | |
|---|---|---|---|
| 7,548,237 B2 | 6/2009 | David et al. | |
| 9,286,081 B2 | 3/2016 | Dunn et al. | |
| 9,569,062 B2 | 2/2017 | Arnold et al. | |
| 9,756,375 B2 | 9/2017 | Chu et al. | |
| 2001/0047394 A1* | 11/2001 | Kloba | H04W 4/00 709/217 |
| 2006/0206820 A1* | 9/2006 | Bullard | H04L 67/38 715/733 |
| 2008/0301157 A1* | 12/2008 | Beaven | G06F 16/958 |
| 2012/0136839 A1* | 5/2012 | Eberlein | G06F 16/273 707/690 |

(Continued)

OTHER PUBLICATIONS

QGIS API, Qgs Map Layer Renderer Class Reference, May 10, 2015; https://qgis.org/api/2.8/classQgsMapLayerRenderer.html.

(Continued)

*Primary Examiner* — Yingchun He
(74) *Attorney, Agent, or Firm* — Haynes and Boone, LLP

(57) ABSTRACT

A method of rendering an object model includes modifying, by a first thread executing on a computer system that is coupled to a display screen, a current object model to generate a new object model that is stored at a first memory address. The method also includes storing, by the first thread, a copy of the new object model at a second memory address. The method further includes updating, by the first thread, a reference to identify the copy of the new object model. The method also includes rendering, by a second thread executing on the computer system, a renderable object model identified by the reference into a buffer that is converted into pixels on the display screen, the first thread being independent of the second thread.

20 Claims, 8 Drawing Sheets

(56) References Cited

U.S. PATENT DOCUMENTS

| | | | |
|---|---|---|---|
| 2015/0089009 A1* | 3/2015 | Tsirkin | G06F 3/067 |
| | | | 709/212 |
| 2015/0187044 A1* | 7/2015 | Torii | G06T 11/00 |
| | | | 345/557 |
| 2016/0232197 A1* | 8/2016 | Vaquero Gonzalez | ......... |
| | | | G06F 3/067 |
| 2017/0032005 A1 | 2/2017 | Zheng et al. | |
| 2017/0185244 A1 | 6/2017 | Hall et al. | |

OTHER PUBLICATIONS

Lin Clark, The whole web at maximum FPS: How WebRender Gets Rid of Jank, Oct. 10, 2017; https://hacks.mozilla.org/2017/10/the-whole-web-at-maximum-fps-how-webrender-gets-rid-of-jank/.

* cited by examiner

COPY-ON-WRITE (COW) RENDERING OF GRAPHICAL OBJECT MODELS

BACKGROUND

The present disclosure generally relates to computing devices, and more particularly to rendering an object model.

An object model is a representation of one or more objects to display on a screen. An application may manipulate the object model in order to "draw" on the display screen by adding or removing nodes representing objects. Graphical user interfaces may be rendered from a hierarchical object model. For example, a button or a text box may be a leaf node in the object model while a table may be a branch node.

A graphical system may be built with a rendering thread that renders the object model. A separate thread that performs construction of the object model may serialize a list of modifications and send it to the rendering thread. The rendering thread modifies the object model from the serialized list of modifications and renders the object model. As a result, a user may view objects represented by the object model on a display.

SUMMARY

According to one example, a method of rendering an object model includes modifying, by a first thread executing on a computer system that is coupled to a display screen, a current object model to generate a new object model. The new object model is associated with an application running on the computing system, is a representation of one or more objects to display on the display screen, and is stored at a first memory address. The method also includes storing, by the first thread, a copy of the new object model at a second memory address. The method further includes updating, by the first thread, a reference to identify the copy of the new object model. The method also includes rendering, by a second thread executing on the computer system, a renderable object model identified by the reference into a buffer that is converted into pixels on the display screen. The first thread is independent of the second thread.

According to one example, a system for rendering an object model includes an object model manipulator that modifies a current object model to generate a new object model, creates an immutable copy of the new object model, and updates a reference to identify the immutable copy. The object model manipulator executes on a computer system that is coupled to a display screen. The new object model is a representation of one or more objects to display on the display screen and is associated with an application running on the computing system. The system also includes a renderer that renders a renderable object model identified by the reference into a buffer that is converted into pixels on the display screen.

A machine-readable medium comprising a plurality of machine-readable instructions that when executed by one or more processors is adapted to cause the one or more processors to perform a method including: modifying, by a first thread executing on a computer system that is coupled to a display screen, a current object model to generate a new object model, the new object model being associated with an application running on the computing system, being a representation of one or more objects to display on the display screen, and being stored at a first memory address; storing, by the first thread, a copy of the new object model at a second memory address; updating, by the first thread, a reference to identify the copy of the new object model; and rendering, by a second thread executing on the computer system, a renderable object model identified by the reference into a buffer that is converted into pixels on the display screen, the first thread being independent of the second thread.

Figure 1:
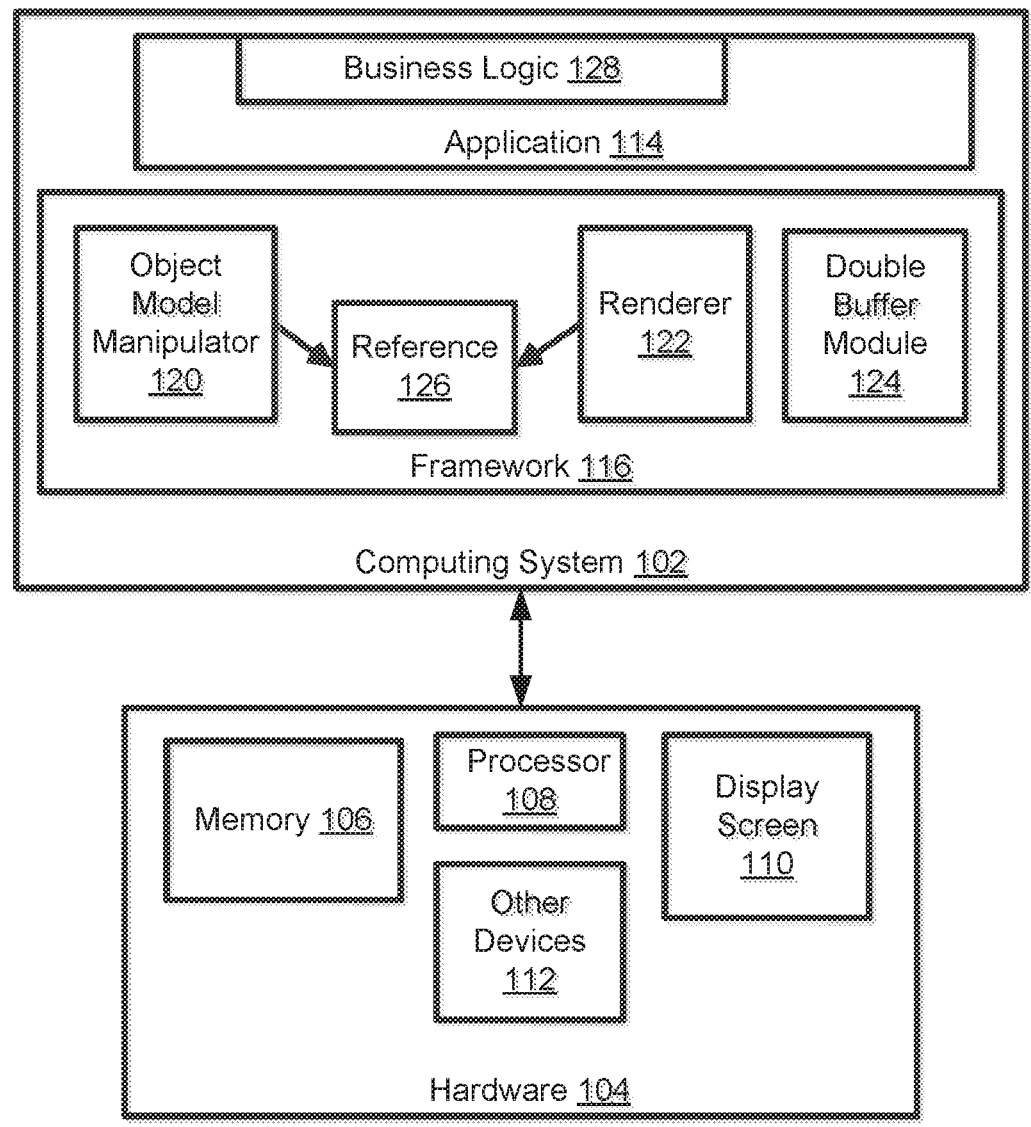
FIG. 1 is a block diagram illustrating an example system for rendering an object model onto a display screen.

In the figures, elements having the same designations have the same or similar functions.

DETAILED DESCRIPTION

In the following description, specific details are set forth describing some examples consistent with the present disclosure. It will be apparent, however, to one skilled in the art that some examples may be practiced without some or all of these specific details. The specific examples disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one example may be incorporated into other examples unless specifically described otherwise or if the one or more features would make an example non-functional.

An object model is a representation of one or more objects to display on a display screen. An application may manipulate the object model such that particular objects are drawn on the screen. The object model may be constructed and rendered in the same thread. A problem of constructing and rendering an object model in the same thread is the high likelihood of "jank" or stutters produced when the construction of the object model blocks the rendering. As a result, visual artifacts may be displayed on the screen or temporary freezes may occur, thus reducing a user's experience in interacting with the application.

A solution to this problem may involve separating the construction of the object model from the rendering of the object model. In particular, a graphical system may be built with a separate rendering thread that renders the object model. A separate thread that performs construction of the object model may serialize a list of modifications and send it to the rendering thread. The rendering thread modifies the object model from the serialized list of modifications and renders the object model. While this approach is an improvement over constructing and rendering an object model in the same thread, the object model manipulation overhead remains in the rendering thread. Accordingly, if complex object model transforms occur, "jank" or stutters may still occur, thus reducing a user's experience in interacting with the application.

A solution to the problem of object model manipulation overhead remaining in the rendering thread may involve applying a copy-on-write (COW) approach to the object model. For example, in response to detecting an attempt to modify a current object model, an object model manipulator may create a copy of the current object model and store the copy at a first memory address. The object model manipulator continues to modify the copy stored at the first memory address rather than the current object model until a new object model that represents a "finished state" or a "renderable state" is generated. The new object model in the renderable state is ready to be rendered by a renderer. In an example, the application builds an object model using the object model manipulator and issues a commit call signaling that modifications to the object model are complete. The application may include business logic that knows when the object model is in the renderable state, thus resulting in generation of the new object model.

The object model manipulator and the renderer maintain a shared reference to an object model. The reference identifies the object model and may be, for example, a pointer or an address. After receiving an indication that the new object model has been generated and ready for rendering, the object model manipulator creates a copy of the new object model and stores the copy at a second memory address. The object model manipulator modifies the shared reference such that it identifies the new object model stored at the first memory address, thus handing ownership of the new object model to the renderer. The object model manipulator may continue to modify the object model stored at the second memory address, which may then be referred to as the current object model, until another commit call is issued. The renderer renders object models that are identified by the shared reference. The renderer may continue to render the object model identified by the shared reference, regardless of whether the referenced object model has changed or not.

In an example, the object model manipulator and the renderer are implemented in separate threads. Each of the object model manipulator and the renderer may perform the above actions at their own respective frequencies. Different actions applied to the object model (e.g., manipulation and render) may be isolated such that the different actions may be scheduled independently. Accordingly, it is unnecessary for the renderer to manipulate any object models by adding or removing nodes.

As discussed in the present disclosure, although additional memory may be used as a result of copying the object model, the performance of the computer system may be better improved. Moreover, render passes do not occur in the middle of object model manipulation if a previously rendered object model identified by the shared reference is atomically replaced with the new object model. Accordingly, the computing system will render smoothly, without the "jank" or stutters discussed above. Additionally, the number of visual artifacts may be reduced or eliminated, thus ensuring that every single frame that is drawn is pixel perfect.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "determining," "receiving," "generating," "creating," "performing," "sending," "rendering," "detecting," "modifying," "converting," "identifying," "comparing," and the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

FIG. 1 is a block diagram 100 illustrating an example system for rendering an object model onto a display screen. FIG. 1 includes a computer system 102 coupled to hardware 104. Computer system 102 may be, for example, a workstation, a personal computer, a server, a game console, a set-top box, a kiosk, an embedded system, a mobile device (e.g., a mobile phone, a personal digital assistant, a tablet, and a laptop), or other device having at least one processor and memory.

Hardware 104 includes a memory 106, a processor 108, a display screen 110, and other devices 112. Computer system 102 is coupled to hardware such as a processor 108 for executing software (e.g., machine-readable instructions) and using or updating data stored in memory 106. Hardware 104 may include one or more processors 108. A "processor" may also be referred to as a "central processing unit," "CPU" or "physical processor" herein. A processor shall refer to a device capable of executing instructions encoding arithmetic, logical, or input/output (I/O) operations. In an example, a processor may follow the Von Neumann architectural model and may include an arithmetic logic unit (ALU), a control unit, and a plurality of registers. In a further aspect, a processor may be a single-core processor that is typically capable of executing one instruction at a time (or processing a single pipeline of instructions), or a multi-core processor that may simultaneously execute multiple instructions. In another aspect, a processor may be implemented as a single-integrated circuit, two or more integrated circuits, or may be a component of a multi-chip module (e.g., in which individual microprocessor dies are included in a single integrated circuit package and hence share a single socket).

Memory 106 may be one or more of many different types of memory. "Memory" herein shall refer to volatile or non-volatile memory, such as random access memory (RAM), read-only memory (ROM), electrically erasable ROM (EEPROM), or any other memory capable of storing data. Some types of memory, such as solid state drives typically have relatively larger storage volume but relatively slower performance. Other types of memory, such as those used for RAM, are optimized for speed and may be referred to as "working memory." The various types of memory may store information in the form of software and data. The software may include an operating system and various other software applications 114. In an example, the operating system may provide a framework 116 to application 114.

Display screen 110 is a physical display device that displays data processed by computer system 102 and one or more components of hardware 104. A physical display device may be, for example, a Liquid-Crystal Display (LCD), High-Definition Multimedia Interface (HDMI) device, a monitor, a television, a projection device, a plasma display panel, a light emitting diode (LED) array, a cathode ray tube (CRT) display, electronic paper, a surface-conduction electron-emitted display (SED), a laser television display, a nanocrystal display or another type of display unit. It will be appreciated that other wireless and wired communication links, and other physical display devices are contemplated, and that the various types named herein are not limiting.

In an example, display screen 110 is part of, and integrated into, computer system 102 (e.g., a screen of computer system 102). Display screen 110 may be sold with and attached to computer system 102 such that when a user views content via the user device, the content is displayed on display screen 110. Computer system 102 may receive data from one or more applications 114 and process the data accordingly. In an example, application 114 may "draw" content on a display device (e.g., display screen 110) that is coupled to computer system 102. Application 114 is a software application that runs on computer system 102. Applicant 114 renders content for display to a user on display screen 110. In an example, application 114 is a web browser that obtains web content over a network such as the Internet. The web browser is designed for use with various web technologies such as hypertext transfer protocol (HTTP), hypertext markup language (HTML), JavaScript, and other web technologies. In another example, application 114 is a game application running on computer system 102.

Application 114 interacts with framework 116 for the rendering of objects onto display screen 110. Framework 116 implements copy-on-write (COW) in association with the rendering process. Framework 116 includes an object model manipulator 120, a renderer 122, and a double buffer module 124. Each of object model manipulator 120, renderer 122, and double buffer module 124 may be implemented by a single thread that operates independently from other threads. At least two of the object model manipulator 120, renderer 122, and double buffer module 124 may be decoupled from each other, without being dependent on the other thread's state.

Application 114 may build and modify an object model via a set of application programming interfaces (APIs) exposed by framework 116. Application 114 may invoke one or more APIs to copy, modify, and/or render an object model in association with the object model manipulator 120, renderer 122, or double buffer module 124. Additionally, application 114 may use the set of APIs to send and/or receive data in association with the components of framework 116. For example, reference to a first component of framework 116 sending data to a second component of framework 116 should also be understood as referring to application 114 sending the data to the second component via the set of APIs. In another example, reference to a first component of framework 116 receiving data from a second component of framework 116 should also be understood as referring to application 114 receiving the data from the second component via the set of APIs.

An object model is a representation of one or more objects to display on display screen 110. In an example, an object model is a hierarchical model of objects to be displayed on display screen 110. The object model may initially be empty, and the application may start building the object model by adding a root node and modifying the object model by adding nodes to or removing nodes from the object model. Although framework 116 is illustrated as being separate from application 114, it should be understood that the framework may be native to application 114. Additionally, framework 116 may be provided by the operating system or a third party.

Object model manipulator 120 manipulates a current object model such that nodes included in the current object model represent the objects to be displayed on display screen 110. Object model manipulator 120 manipulates the current object model by adding nodes to or removing nodes from the current object model. In an example, application 114 is a web browser, and the user desires to add two new buttons to a webpage. Object model manipulator 120 modifies the current object model by adding two nodes representing buttons, and the resulting current object model may represent a webpage with the two additional buttons.

Application 114 includes business logic 128 having instructions regarding when modifications to the current object model are complete and have resulted in a new object model, which represents a renderable state. Application 114 may issue a commit call based on business logic 128 rather than based on a timeframe (e.g., 60 frames per second (fps)). In an example, the commit call is implemented by a method on an object model itself. In another example, the commit call is separate from an object model and receives the object model as a parameter. The commit call signals to framework 116 that the modified object model is complete and should be rendered.

Object model manipulator 120 and renderer 122 share a reference 126, which references a single object model. Reference 126 may be a pointer to or may be a memory address that references the object model. In an example, the current object model is stored at a first memory address. The object model manipulator 120 continues to modify the current object module until a commit call is detected, signaling to the object model manipulator 120 that the new object model has been generated and is ready to be rendered. In response to detecting the commit call, the object model manipulator 120 copies the new object model stored at the first memory address, stores the copy at a second memory address, and updates reference 126 to reference the new object model stored at the second memory address. Object model manipulator 120 may continue to modify the object model stored at the second memory address, which may also be referred to as the current object model, until the object model manipulator detects another commit call. In an example, the object model manipulator 120 creates an immutable copy of the new object model and updates the reference 126 to reference the immutable copy. In this example, the object model manipulator 120 may continue to modify the new object model, and the renderer 122 is unable to modify the immutable copy.

Renderer 122 reads the memory address identified by reference 126 and renders the object model stored at the memory address to a buffer. Renderer 122 may render at its own frequency the object models referenced by reference 126, unaware whether the underlying referenced object model has changed from the last render.

Double buffer module 124 switches between a first buffer and a second buffer for selection of an active buffer. The content stored in the active buffer is displayed on display screen 110. Within a single transaction, double buffer module 124 may switch the active buffer from the first buffer to the second buffer or vice-versa. Double buffer module 124 may be hardware (e.g., graphics card) or software.

Figure 2A:
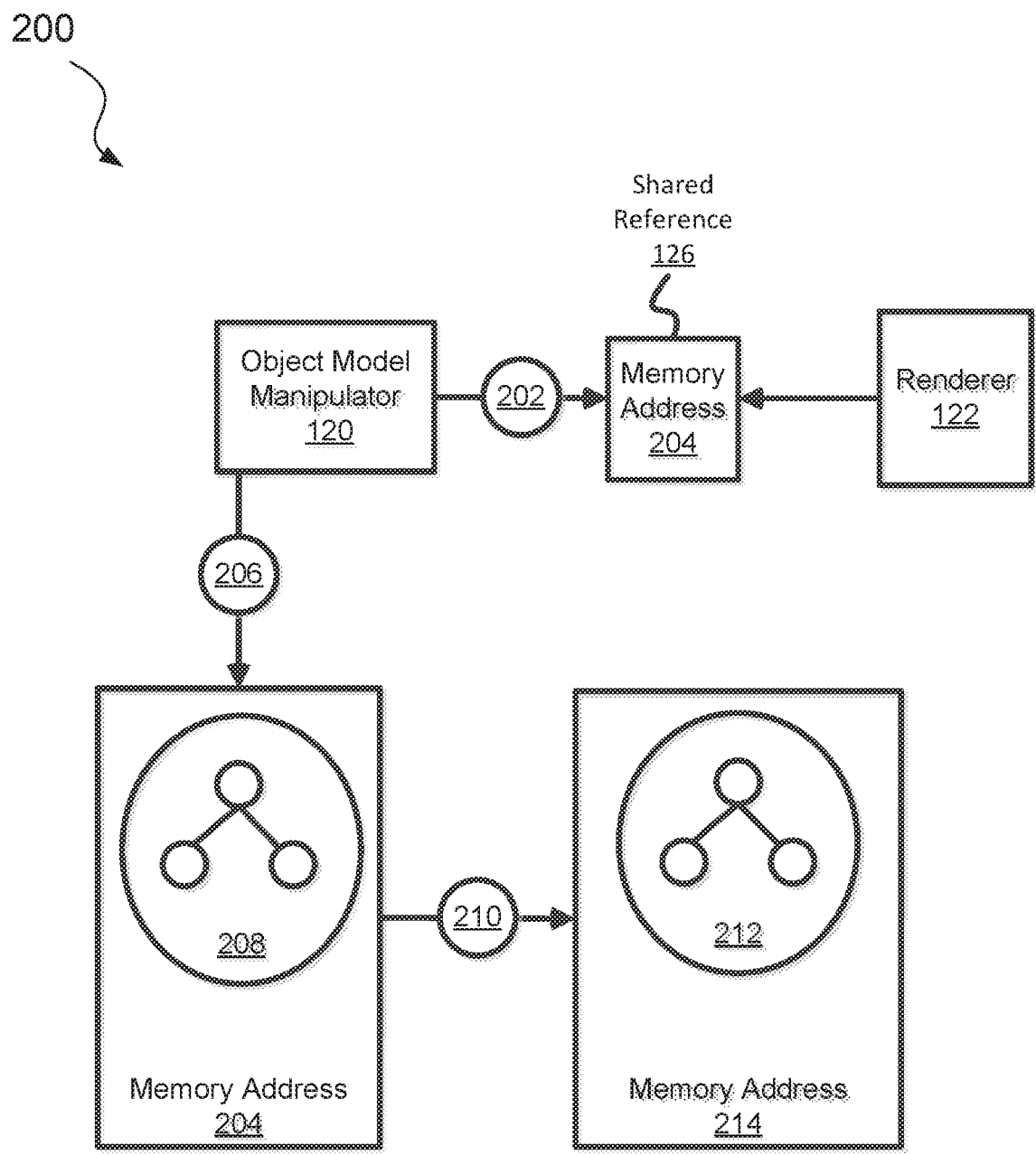
FIGS. 2A-2C illustrate a process flow for rendering an object model in accordance with the present disclosure.
Figure 2B:
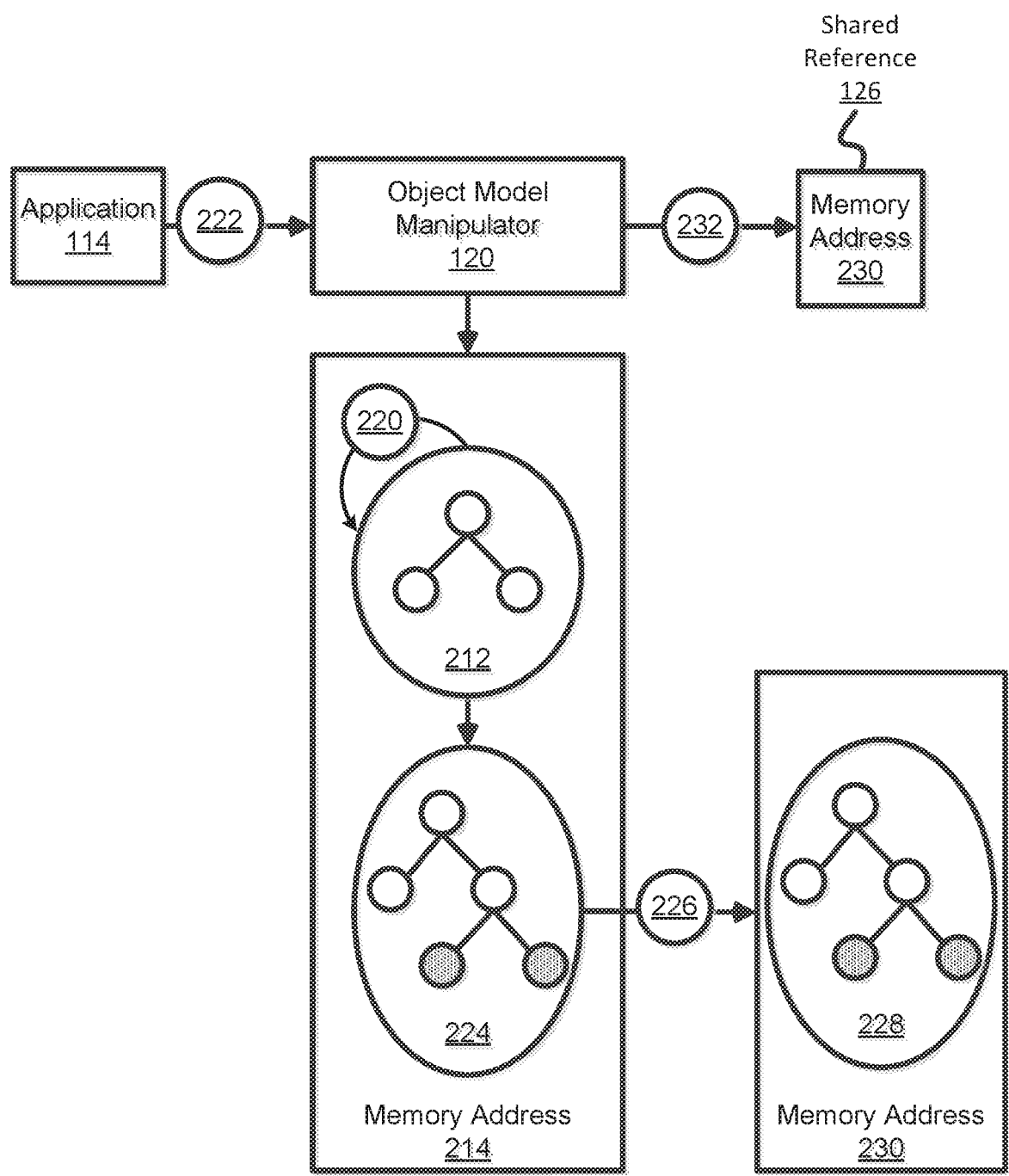
Figure 2C:
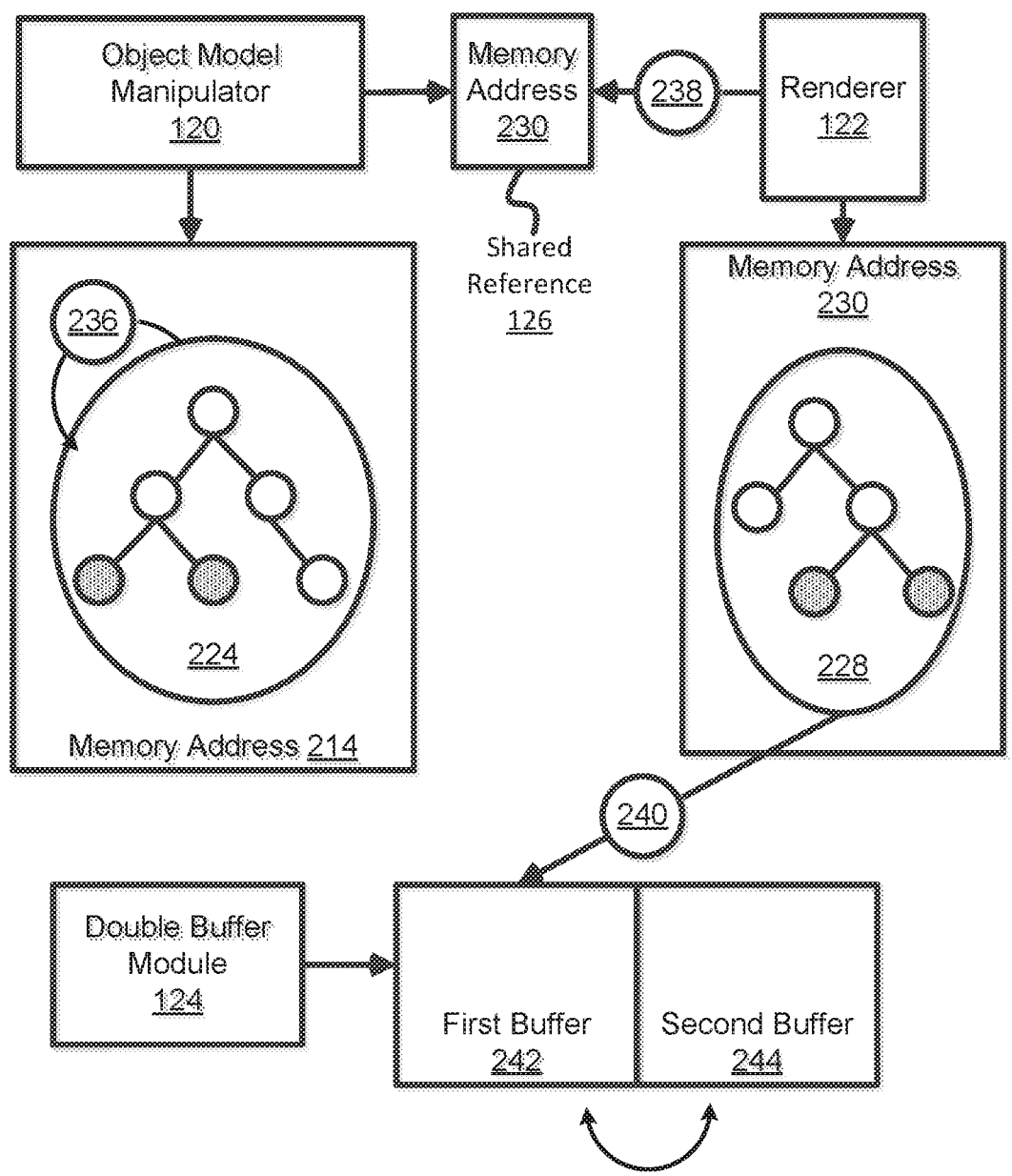

FIGS. 2A-2C illustrate a process flow for rendering an object model in accordance with the present disclosure. In FIG. 2A, at action 202, object model manipulator 120 dereferences reference 126 and reads a memory address 204 at which an object model is stored. Renderer 122 may have previously rendered the object model.

At action 206, object model manipulator 120 retrieves a current object model 208 stored at memory address 204. At action 210, object model manipulator 120 creates an object model 212 that is a copy of current object model 208 and stores object model 212 at a memory address 214. In an example, object model manipulator 120 detects an attempt to modify current object model 208. In response to detection of the attempt, rather than modify current object model 208, object model manipulator 120 creates a copy of the current object model and modifies the copy as a transaction under COW (as discussed further below). Object model manipulator 120 may pass object model 208 to a garbage collection thread (not shown).

The object model manipulator 120 manipulates the current object model, which is now object model 212 created by the object model manipulator 120 and stored at memory address 214. In FIG. 2B, at an action 220, object model manipulator 120 modifies current object model 212 in accordance with input from an application for which the object model was built. Object model manipulator 120 continues to modify current object model 212 until the object model manipulator receives an indication that it is in a "finished state" and ready for rendering.

At an action 222, application 114 issues a commit call to object model manipulator 120, which takes the commit call as the indication that modifications to object model 212 are complete and a new object model 224 has been generated. In an example, within a single transaction, object model manipulator 120 modifies the current object model 212 until application 114 issues the commit call. Issuance of the commit call concludes the transaction in which the current object model 212 is modified and is an indication to framework 116 to update the rendering cycle. Using the above example, application 114 may issue the commit call after the node(s) representing the addition of the two buttons are added to the object model. Accordingly, renderer 122 does not render incomplete states of an object model, thus preventing the display of visual artifacts that mitigate a user's experience. Application 114 may be modified to include an instruction to issue the commit call, which indicates to framework 116 that modification(s) to the object model are complete and the current object model ready for rendering.

In response to the indication that modifications to the current object model are complete, at action 226, object model manipulator 120 creates an immutable object model 228 that is a copy of new object model 224. Object model manipulator 120 stores immutable object model 228 at a memory address 230 and may continue to modify current object model 224 by adding nodes to and/or removing nodes from the current object model. Additionally, in response to the indication, at action 232, object model manipulator 120 updates reference 126 to reference memory address 230, which stores immutable object model 228 in the finished state. Renderer 122 is unable to modify immutable object model 228. Reference 126 may be, for example, a pointer to a renderable object model or a memory address where the renderable object model is stored.

In FIG. 2C, at an action 236, object model manipulator 120 may continue to modify current object model 224 by adding nodes to and/or removing nodes from the current object model. At action 238, renderer 122 reads the memory address 230 identified by reference 126. At action 240, renderer 122 renders immutable object model 228 stored at memory address 230 into a buffer that is converted into pixels on display screen 110. It is unnecessary for renderer 122 to know that a change in the underlying object model to be rendered has occurred. In an example, renderer 122 and double buffer module 124 share a memory address and renderer 122 copies the value referenced by reference 126 into the shared memory address.

In an example, object model manipulator 120 updates reference 126 in a single transaction. A single transaction is completed within a single CPU operation (e.g., modifying a pointer, replacing the address referenced by reference 126, etc.), and renderer 122 may reference the immutable object model atomically. Accordingly, it may be unnecessary to coordinate a locking or synchronization mechanism between object model manipulator 120 and renderer 122 for rendering an object model. Accordingly, the performance of computer system 102 may be improved by performing the aforementioned actions within an atomic operation.

By creating the immutable object model 228, object model manipulator 120 may pass the immutable object model to renderer 122 for rendering and continue to manipulate current object model 224. Accordingly, the rendering and the manipulation of the object model may be separated and lead to better system performance. The use of COW may enable two independent threads (e.g., object model manipulator 120 and renderer 122) to operate independently of each other, providing an infrastructure in which manipulation and rendering of objects may occur without being dependent on the state of the other. As discussed, application 114 may issue the commit call, which may be synchronous with regard to the amount of time it takes object model manipulator 120 to modify a current object model and generate the new object model.

The commit call may change the underlying object model that renderer 122 renders, but does not change when the renderer runs. Renderer 122 may continue to run and render the object model referenced by reference 126 into a buffer (e.g., 60 fps) regardless of when a commit call is issued. Renderer 122 is decoupled from manipulation of the object model, and can be scaled entirely independent of the manipulation. The rendering process may be slowed down to, for example, account for a user's experience. If the user unplugs her laptop and cares more about saving battery power than fast rendering, the renderer may be slowed down from rendering at 60 fps to 15 fps, without affecting the object model manipulation. Accordingly, renderer 122 may be throttled for battery savings.

At a later point in time, application 114 may issue another commit call, resulting in object model manipulator 120 creating an immutable copy of the current object model and updating reference 126 to reference the immutable copy. Object model manipulator 120 may continue working on the current object model. A time period during which renderer 122 renders the immutable object model, which is a copy of a current object model, may overlap with a time period during which object model manipulator 120 manipulates the current object model. Accordingly, it may be unnecessary for application 114 to wait for renderer 122 to finish rendering the committed object model before continuing to execute application code.

In the example illustrated in FIG. 2C, computer system 102 implements the double buffering technique, in which two different memory buffers are used and data in one buffer is being processed while the next set of data is read into the other buffer. In FIG. 2C, at most one of a first buffer 242 and a second buffer 244 is active at any point in time. Content stored in the active buffer is converted into pixels on display screen 110. Double buffer module 124 switches between first buffer 242 and second buffer 244 for selection of the active buffer. After renderer 122 renders immutable object model 228 into first buffer 242, double buffer module 124 may switch the active buffer to first buffer 242 such that the content stored in the first buffer is displayed on display screen 110. In an example, within a single transaction, double buffer module 124 switches the active buffer from one buffer to another buffer. The next time around, double buffer module 124 may switch the active buffer from first buffer 242 to second buffer 244 such that content stored in the second buffer is displayed on display screen 110. Double buffer module 124 may be hardware (e.g., graphics card) or software.

Usage of processor 108 may be flat such that the number of instructions processed by processor 108 remains constant. In an example, renderer 122 continually renders data and updates 60 fps. Renderer 122 may continue to render at its original rendering speed (e.g., 60 fps), regardless of whether its reference to the to-be-rendered object model (e.g., reference 126) has changed. Renderer 122 is decoupled from the switching of the active buffer (e.g., implemented by double buffer module 124) and can be scaled entirely independent of the switching of the active buffers.

Additionally, it may be unnecessary for renderer 122 to render an entire object model hierarchy. For example, renderer 122 may optimize the rendering process by determining a change between the previously rendered object model and the currently referenced object model (the object model to be rendered). Renderer 122 may determine which parts of the display screen 110 remain the same and render only the content that has changed since the last render.

Moreover, although object model manipulator 120 updates reference 126 to reference a copy of the current object model, it should be understood that in other examples, object model manipulator 120 may update reference 126 to reference the current object model and modify the copy of the current object model. In an example, object model manipulator 120 may create a copy of new object model 224, store the copy at a particular memory address, update reference 126 to store memory address 214, which stores the new object model 224, and modify the object model copy (e.g., object model 228) stored at memory address 230 until a commit call is issued. In this example, renderer 122 renders object model 224.

Figure 3:
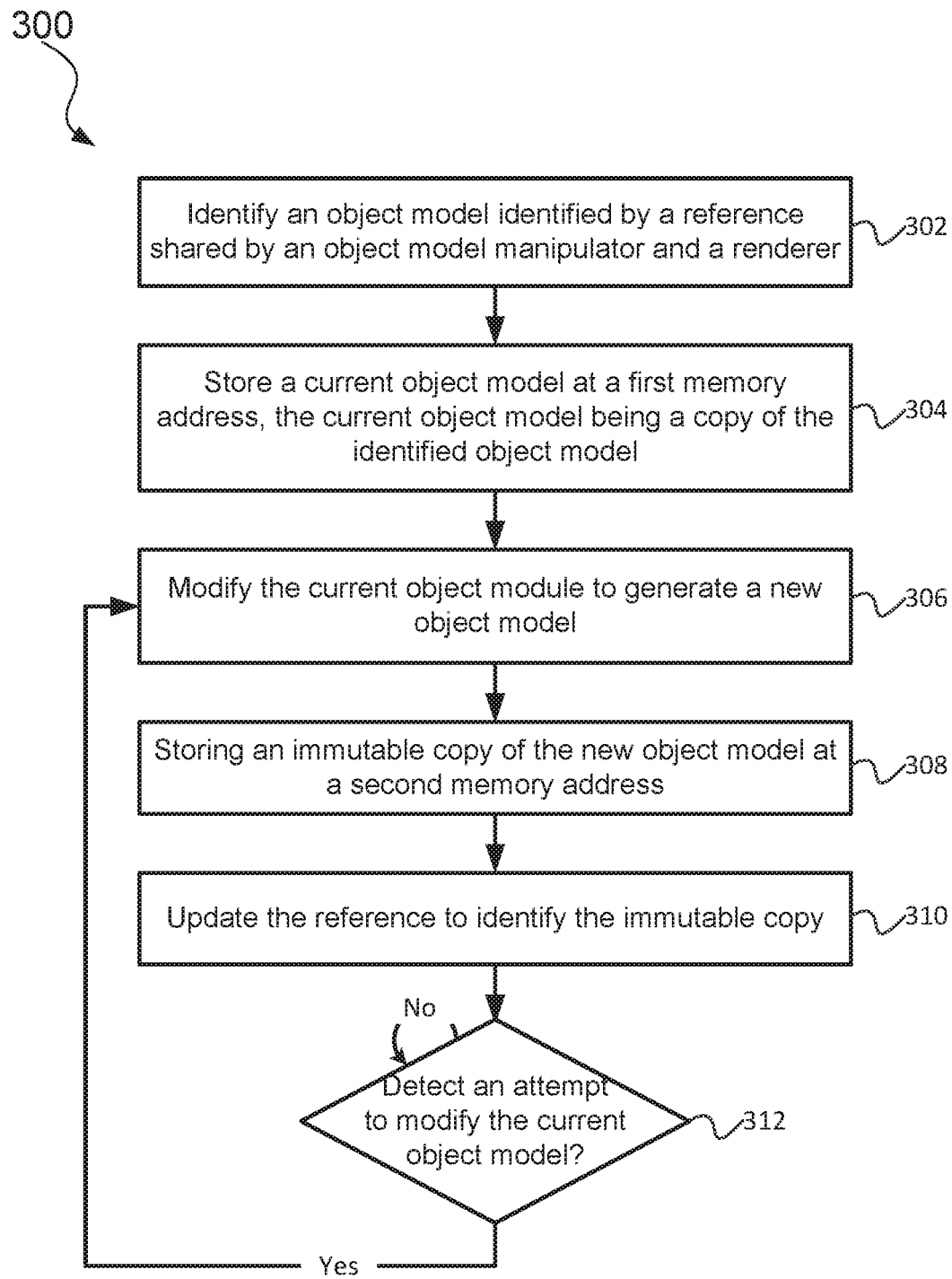
FIG. 3 is an example flow diagram showing an illustrative method for rendering an object model.

FIG. 3 is an example flow diagram showing an illustrative method 300 for rendering an object model. The method 300 may be performed by processing logic that may include hardware (e.g., circuitry, dedicated logic, programmable logic and microcode), software (such as instructions run on a computer system, specialized hardware, dedicated machine, or processing device), firmware, or a combination thereof.

In the present example, the method 300 begins at action 302, where object model manipulator 120 identifies an object model identified by a reference shared by the object model manipulator and renderer 122. In an example, the reference is a pointer that points to a memory address at which the object model is stored, and object model manipulator dereferences the pointer. In another example, the reference is a memory address that stores the memory address at which the object model is stored. At action 304, object model manipulator 120 stores a current object model at a first memory address, the current object model being a copy of the identified object model.

At action 306, object model manipulator 120 modifies the current object model to generate a new object model. Object model manipulator 120 may continue to modify the current object model until a commit call from the application is detected. The new object model is ready to be rendered. At action 308, object model manipulator 120 creates an immutable copy of the new object model. At action 310, object model manipulator 120 updates the reference to identify the immutable copy. At action 312, it is determined whether object model manipulator 120 detects an attempt to modify the current object model. If so, process flow moves from action 312 to action 306. If not, object model manipulator 120 may wait until an attempt to modify the current object model is detected.

It is also understood that additional processes may be inserted before, during, or after blocks 302-312 discussed above. It is also understood that one or more of the blocks of method 300 described herein may be omitted, combined, or performed in a different sequence as desired. In an example, actions 302 and 304 are performed for initialization purposes, and actions 306, 308, 310, and 312 are performed in an infinite loop. Object model manipulator 120 may perform these actions at its own frequency.

While object model manipulator 120 executes the method 300, renderer 122 may read the memory address identified by the reference and render the object model that is stored at the memory address to a buffer that is converted into pixels on display screen. Renderer 122 may perform these actions at its own frequency. Additionally, while object model manipulator 120 executes the method 300, double buffer module 124 may switch between a first buffer and a second buffer for selection of an active buffer, where content stored in the active buffer is displayed on the display screen. Double buffer module 124 may perform these actions at its own frequency.

In an example, the object model manipulator may have updated the reference shared by the object model manipulator and the renderer twice, and the renderer may or may not have rendered one or both object models identified by the reference. For example, although the object model manipulator updated the reference to identify immutable copy 412, it may be the case that the renderer does not render immutable copy 412. In an example, after object model manipulator 120 updates the reference, renderer 122 itself may be in the process of rendering an object model that was identified by the previous value of the reference.

In some examples, renderer 122 compares the renderable object model referenced by the reference and a previously rendered object model and identifies, based on the comparing, a difference between the renderable object model and the previously rendered object model. Renderer 122 may render the difference into the buffer, which is eventually displayed on the display screen.

Figure 4:
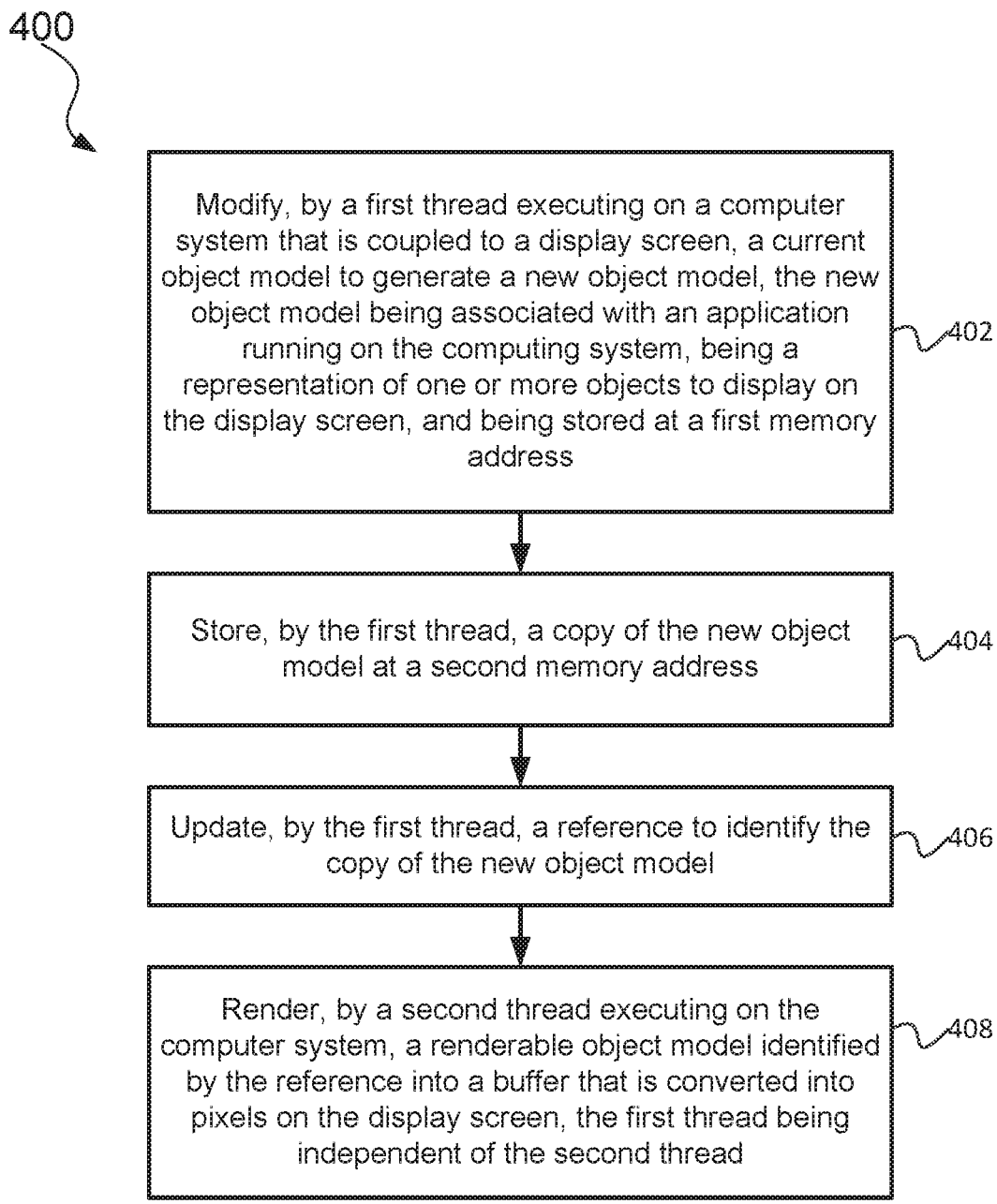
FIG. 4 is an example flow diagram showing an illustrative method for rendering an object model.

FIG. 4 is an example flow diagram showing an illustrative method 400 for rendering an object model. The method 400 may be performed by processing logic that may include hardware (e.g., circuitry, dedicated logic, programmable logic and microcode), software (such as instructions run on a computer system, specialized hardware, dedicated machine, or processing device), firmware, or a combination thereof.

In the present example, the method 400 begins at action 402, where a first thread executing on a computer system that is coupled to a display screen modifies a current object model to generate a new object model. The new object model is associated with an application running on the computing system and is a representation of one or more objects to display on the display screen. Additionally, the new object model is stored at a first memory address.

At action 404, the first thread stores a copy of the new object model at a second memory address. At action 406, the first thread updates a reference to identify the copy of the new object model. At action 408, a second thread executing on the computer system renders a renderable object model identified by the reference into a buffer that is converted into pixels on the display screen. The first thread is independent of the second thread.

It is also understood that additional processes may be inserted before, during, or after blocks 402-408 discussed above. It is also understood that one or more of the blocks of method 400 described herein may be omitted, combined, or performed in a different sequence as desired.

Figure 5:
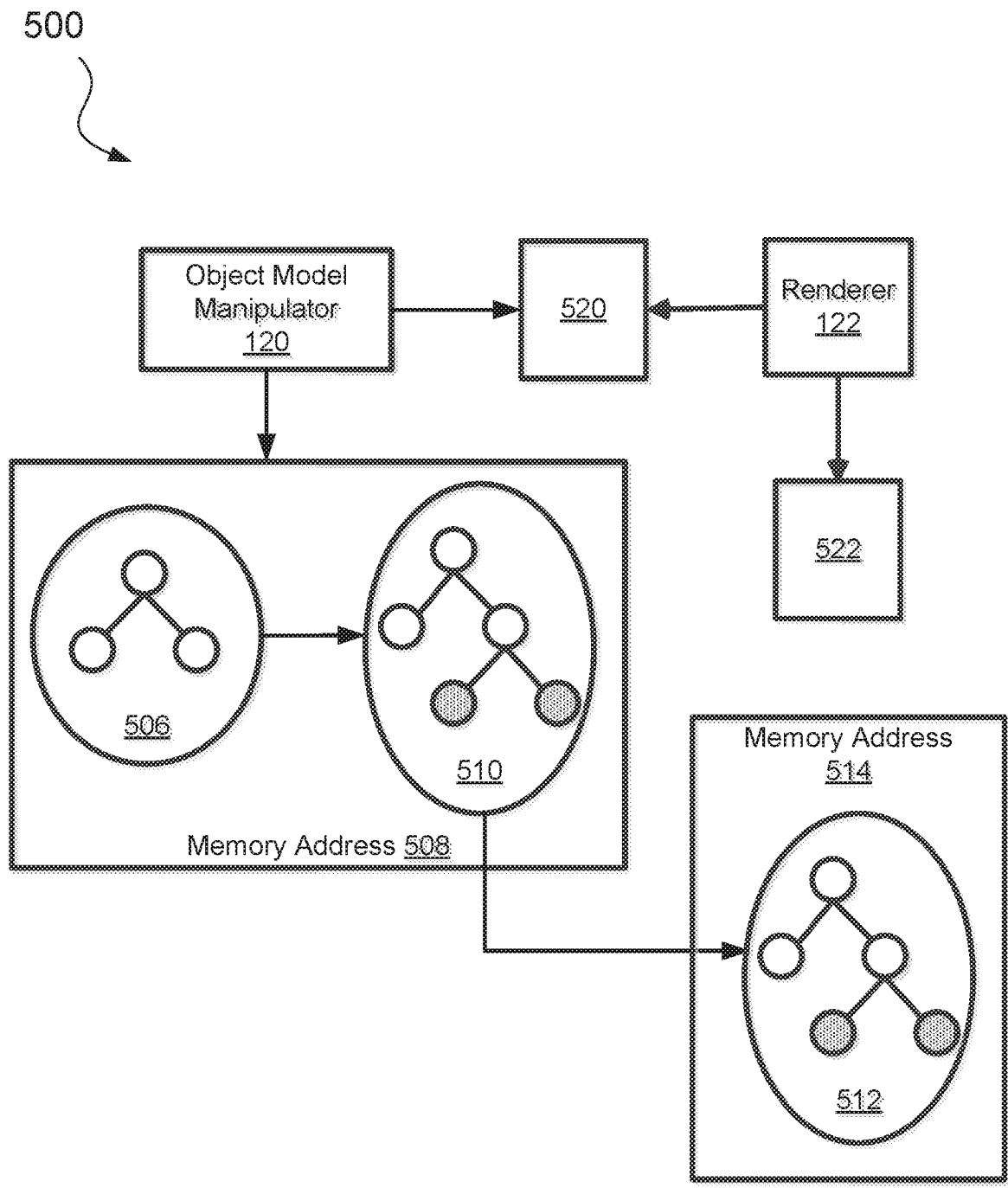
FIG. 5 is an example system diagram for rendering an object model in accordance with the present disclosure.

FIG. 5 is an example system diagram 500 for rendering an object model in accordance with the present disclosure. Object model manipulator 120 modifies a current object model 506 to generate a new object model 510. In an example, object model manipulator 120 modifies current object model 506 until a commit call is received from the application. The new object model 510 is stored at memory address 508 and is an object model that is ready to be rendered by renderer 122.

Object model manipulator 120 creates an immutable copy 512 of the new object model and stores the immutable copy 512 at a memory address 514. Object model manipulator 120 updates a reference 520 to identify immutable copy 512. The reference 520 is shared between object model manipulator 120 and renderer 122. Object model manipulator 120 may continue to monitor for attempted modifications to the object model. Object model manipulator 120 continues to modify new object model 510 until a commit call is received from the application.

Renderer 122 renders a renderable object model identified by reference 520 into a buffer 522 that is converted into pixels on the display screen. Renderer 122 may render object models at its own frequency. In an example, reference 520 identifies a given object model, and object model manipulator 120 updates reference 520 to identify immutable value 512. A time period during which reference 520 identifies immutable copy 512 may overlap with a time period during which renderer 122 renders the given object model, which is identified by the previous value of reference 520.

Figure 6:
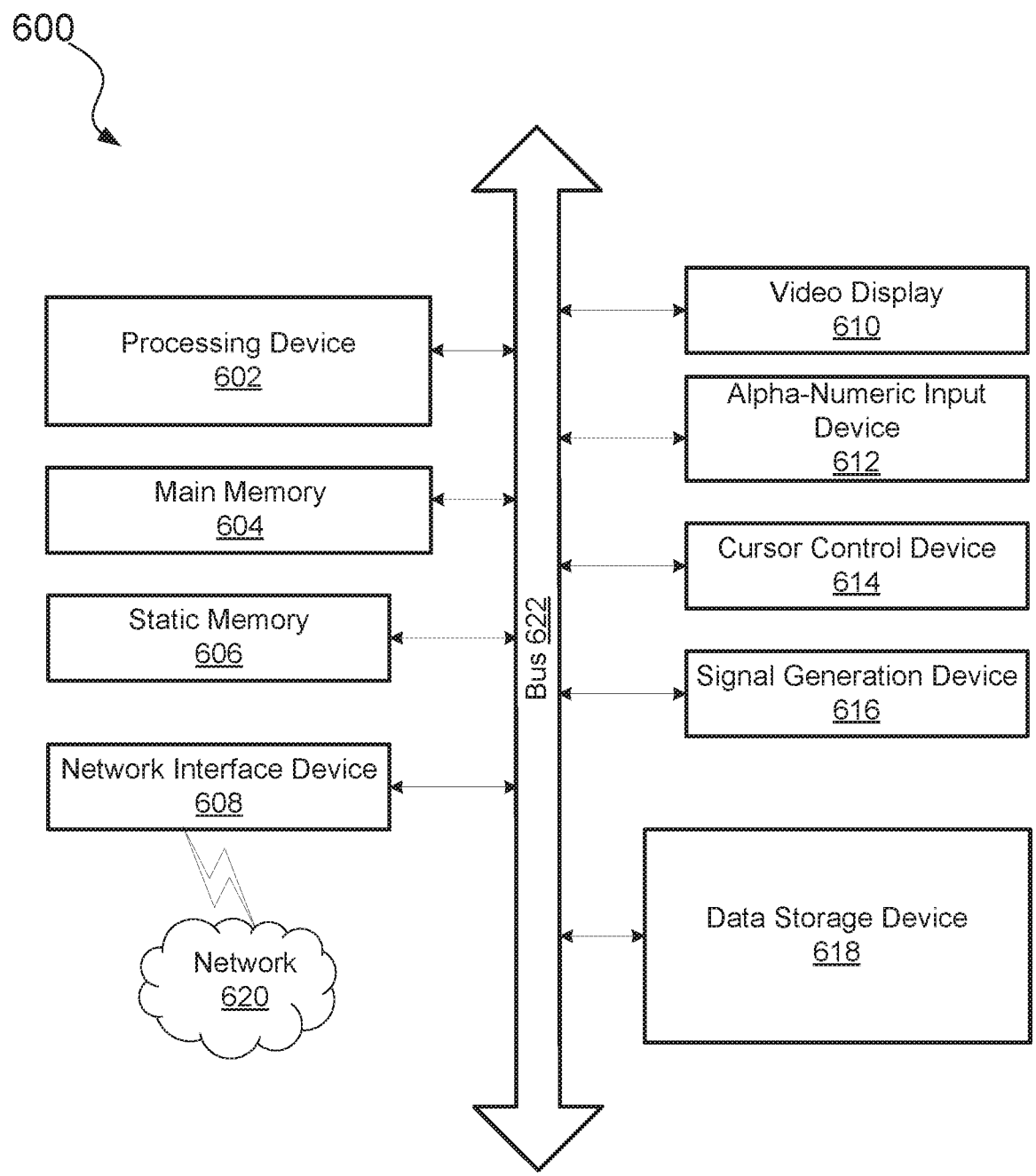
FIG. 6 is a block diagram illustrating an example computer system that may perform one or more of the operations described herein.

FIG. 6 illustrates a system diagram of a machine in the exemplary form of a computer system 600 within which a set of instructions, for causing the machine to perform any one or more of the methodologies discussed herein, may be executed. The machine may be connected (e.g., networked) to other machines in a local area network (LAN), an Intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

In the present example, computer system 600 includes processing device (e.g., processor 108) 602, main memory 604 (e.g., read-only memory (ROM), flash memory, dynamic random access memory (DRAM) such as synchronous DRAM (SDRAM), double data rate (DDR SDRAM), or DRAM (RDRAM), and so forth), static memory 606 (e.g., flash memory, static random access memory (SRAM), and so forth), and data storage device 618, which communicate with each other via bus 622.

Processor 602 represents one or more general-purpose processing devices such as a microprocessor, central processing unit, or the like. More particularly, processor 602 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. Processor 602 may also be one or more special-purpose processing devices such as an application specific integrated circuit (ASIC), a field programmable gate array (FPGA), a digital signal processor (DSP), network processor, or the like. Processor 602 is configured to execute instructions for performing the operations, actions, and steps discussed herein.

Computer system 600 may further include network interface device 608. Computer system 600 also may include video display unit 610 (e.g., a liquid crystal display (LCD) or a cathode ray tube (CRT)), alphanumeric input device 612 (e.g., a keyboard), cursor control device 614 (e.g., a mouse), and signal generation device 616 (e.g., a speaker). Video display unit 610 may correspond to display screen 110.

Data storage device 618 may include a computer-readable storage medium that stores one or more sets of instructions (e.g., software) embodying any one or more of the methodologies or functions described herein. The instructions may also reside, completely or at least partially, within main memory 604 and/or within processor 602 during execution thereof by computer system 600, main memory 604 and processor 602 also constituting computer-readable storage media. Main memory 604 may include the buffers into which renderer 122 renders an object model. The instructions may further be transmitted or received over network 620 via network interface device 608. While data storage device 618 is shown in an example to be a single medium, the term "data storage device" should be taken to include a single medium or multiple media (e.g., a centralized or distributed database, and/or associated caches and servers) that store the one or more sets of instructions.

The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, for reasons of common usage, to refer to these signals as bits, values, elements, symbols, characters, terms, numbers, or the like.

Certain examples of the present disclosure also relate to an apparatus for performing the operations herein. This apparatus may be constructed for the intended purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A method of rendering an object model, comprising:
    modifying, by a first thread executing on a computer system that is coupled to a display screen, a current object model to generate a first new object model, the first new object model being associated with an application running on the computing system, the first new object model being a representation of one or more objects to display on the display screen, and the first new object model being stored at a first memory address;
    receiving, by the first thread from the application, a commit call indicating that the first new object model is in a renderable state, the commit call being independent from a timeframe;
    storing, by the first thread, a copy of the first new object model at a second memory address in response to receiving the commit call, wherein the stored copy is an immutable copy of the first new object model, and the first memory address is different from the second memory address;
    updating, by the first thread, a reference to identify the immutable copy stored at the second memory address; and
    rendering, by a second thread executing on the computer system, a renderable object model identified by the reference into a buffer that is converted into pixels on the display screen, the first thread being independent of the second thread.

2. The method of claim 1, further comprising:
    modifying, by the first thread, the first new object model to generate a second new object model, wherein a time period during which the first new object model is modified overlaps with a time period during which the renderable object model is rendered.

3. The method of claim 1, wherein the reference identifies a given object model and is updated to identify the immutable copy of the first new object model, the method further comprising:
    modifying, by the first thread, the first new object model to generate a second new object model, wherein a time period during which the first new object model is modified overlaps with a time period during which the given object model is rendered.

4. The method of claim 1, further comprising:
    receiving, by the first thread, an object model from the application, the object model being a second representation of one or more objects to display on the display screen;
    creating the current object model by copying the object model; and
    storing, by the first thread, the current object model at the first memory address.

5. The method of claim 4, further comprising:
    detecting, by the first thread, an attempt to modify the object model, wherein creating the current object model includes in response to detecting the attempt, creating the current object model.

6. The method of claim 1, wherein modifying the current object model, receiving the commit call, and updating the reference is performed within an atomic operation.

7. The method of claim 1, wherein the first thread modifies the current object model to generate the first new object model and receives the commit call in a single transaction.

8. The method of claim 1, wherein the timeframe specifies a number of frames per second.

9. The method of claim 1, wherein the current object model is a hierarchical model of objects, and wherein the modifying includes adding a node to the current object model.

10. The method of claim 1, wherein the current object model is a hierarchical model of objects, and wherein the modifying includes removing a node from the current object model.

11. A system for rendering an object model, comprising:
    an object model manipulator that modifies a current object model to generate a first new object model, creates an immutable copy of the first new object model, updates a reference to identify the immutable copy, and receives a commit call indicating that the first new object model is in a renderable state, wherein the object model manipulator executes on a computer system that is coupled to a display screen, wherein the first new object model is a representation of one or more objects to display on the display screen and is associated with an application running on the computing system, and wherein the commit call is independent from a timeframe; and
    a renderer that renders a renderable object model identified by the reference into a buffer that is converted into pixels on the display screen.

12. The system of claim 11, wherein the object model manipulator modifies the first new object model to generate a second new object model, and wherein a time period during which the object model manipulator modifies the first new object model overlaps with a time period during which the renderer renders the renderable object model.

13. The system of claim 12, further comprising:
    a double buffer module that selects one of a first buffer and a second buffer as being an active buffer and displays content stored in the active buffer on the display screen.

14. The system of claim 13, wherein a time period during which the object model manipulator modifies the first new object model overlaps with a time period during which the double buffer module displays content stored in the active buffer.

15. The system of claim 11, wherein the reference identifies a given object model and is updated to identify the immutable copy of the first new object model, wherein the object model manipulator modifies the first new object model to generate a second new object model, and wherein a time period during which the object model manipulator modifies the first new object model overlaps with a time period during which the renderer renders the given object model.

16. The system of claim 11, wherein the reference is a pointer, and the object model manipulator updates the reference by updating the pointer to point to the immutable copy.

17. The system of claim 11, wherein the reference includes a first memory address storing a second memory address, and the object model manipulator updates the reference by storing a third memory address at which the immutable copy is stored into the first memory address.

18. The system of claim 11, wherein the renderer renders, dependent on the timeframe, an object model identified by the reference.

19. The system of claim 18, wherein the renderer renders the object model identified by the reference independent of when the commit call is issued.

20. A non-transitory machine-readable medium comprising a plurality of machine-readable instructions that when executed by one or more processors is adapted to cause the one or more processors to perform a method comprising:

modifying, by a first thread executing on a computer system that is coupled to a display screen, a current object model to generate a first new object model, the first new object model being associated with an application running on the computing system, the first new object model being a representation of one or more objects to display on the display screen, and the first new object model being stored at a first memory address;

receiving, by the first thread from the application, a commit call indicating that the first new object model is in a renderable state, the commit call being independent from a timeframe;

storing, by the first thread, a copy of the first new object model at a second memory address in response to receiving the commit call, wherein the first memory address is different from the second memory address;

updating, by the first thread, a reference to identify the first new object model stored at the first memory address;

rendering, by a second thread executing on the computer system, a renderable object model identified by the reference into a buffer that is converted into pixels on the display screen, the first thread being independent of the second thread; and modifying, by the first thread, the first new object model stored at the second memory address to generate a second new object model, wherein a time period during which the first new object model is modified overlaps with a time period during which the renderable object model is rendered.

* * * * *